April 29, 1924. 1,492,511
G. F. DICKSON ET AL
TRAY HANDLING MEANS FOR PRESSING MACHINES
Filed June 27, 1921    5 Sheets-Sheet 1
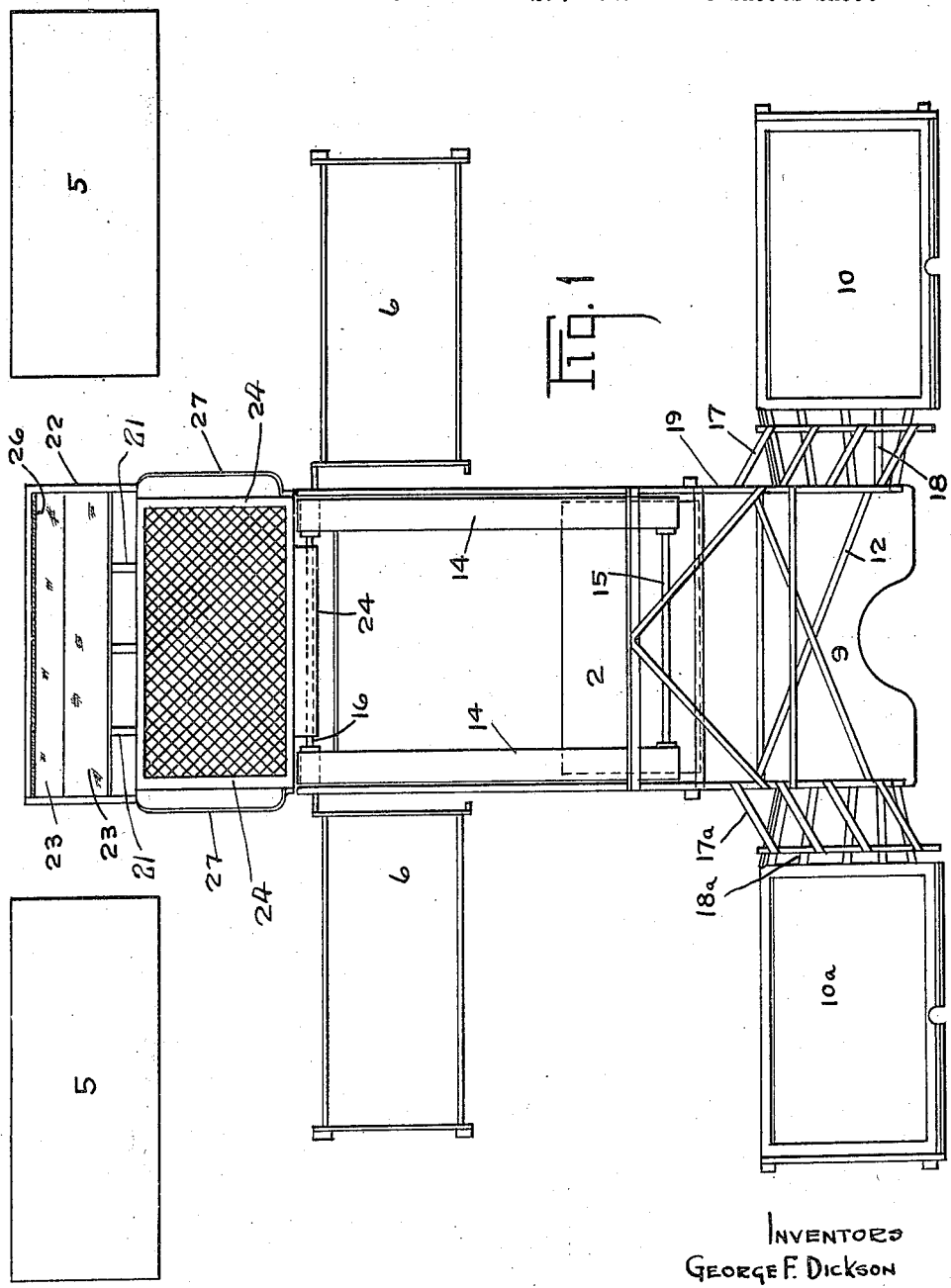
INVENTORS
GEORGE F. DICKSON
FREDERIC H. SORENSEN
THEODORE OLSON
By Paul & Paul
THEIR ATTORNEYS April 29, 1924.
G. F. DICKSON ET AL
1,492,511
TRAY HANDLING MEANS FOR PRESSING MACHINES
Filed June 27, 1921   5 Sheets-Sheet 2
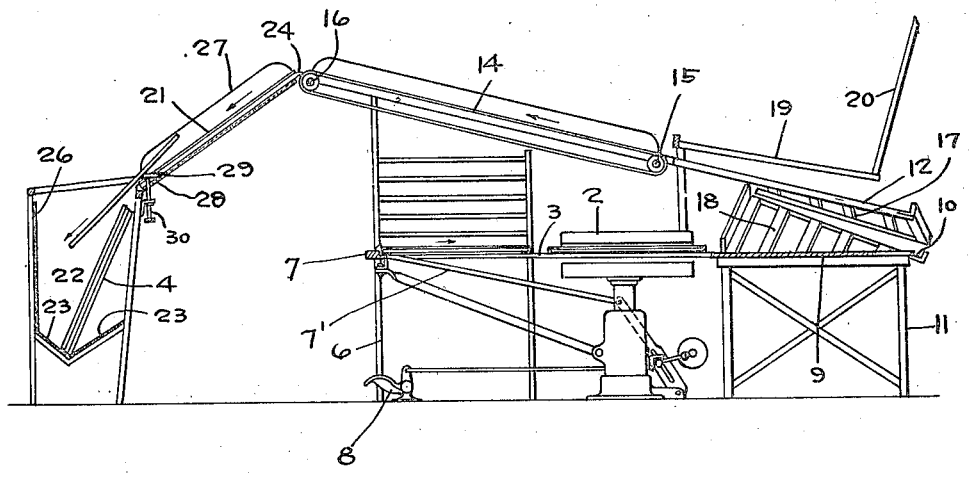
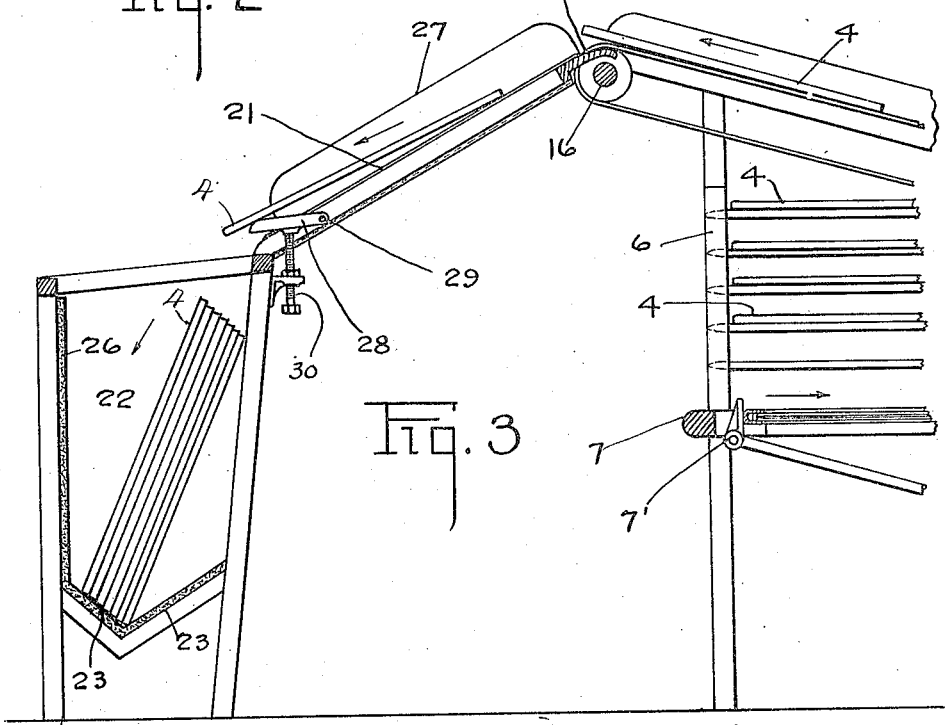
Inventors
George F. Dickson
Frederic H. Sorensen
Theodore Olson
By Paul Carl
Their Attorneys

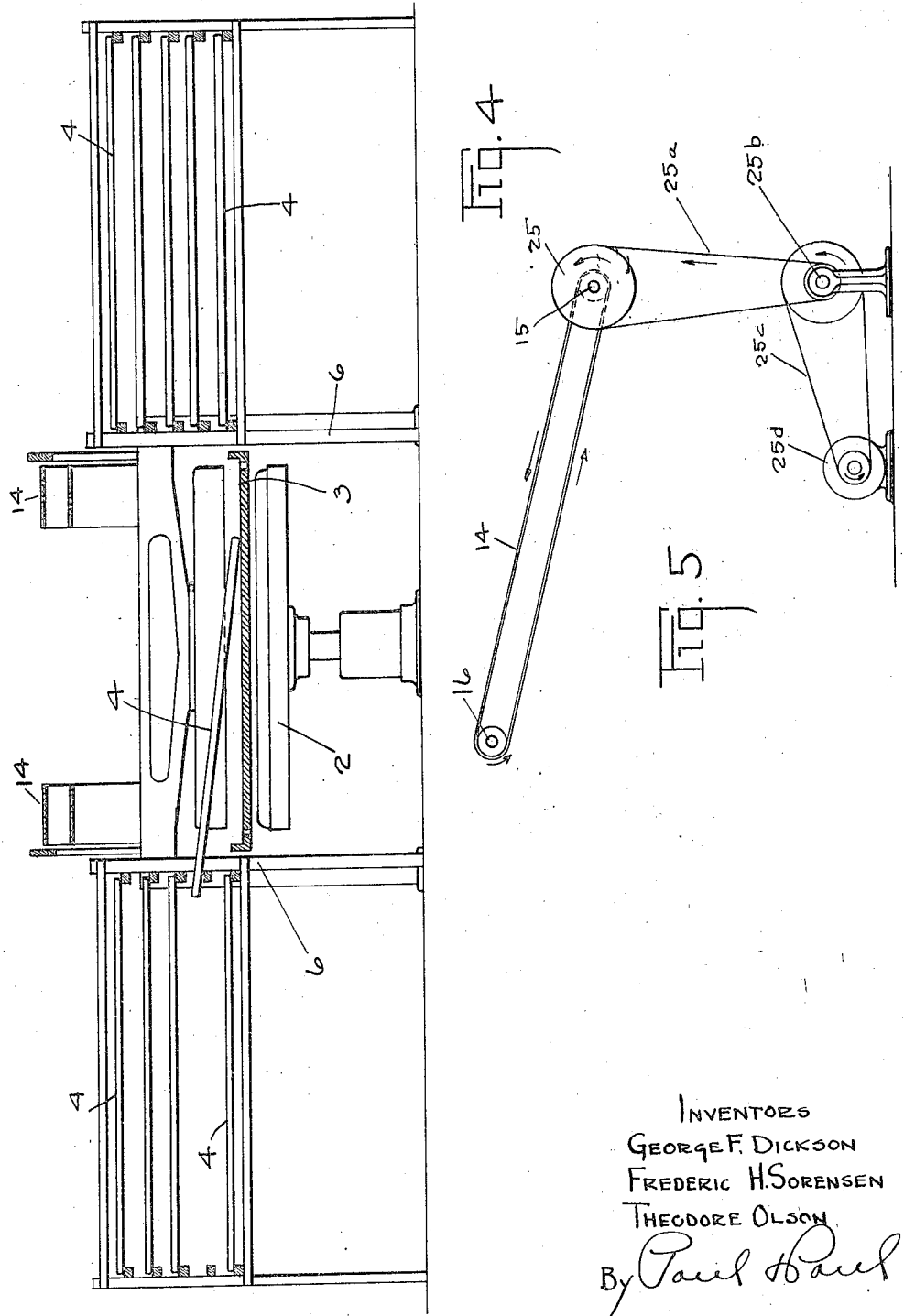

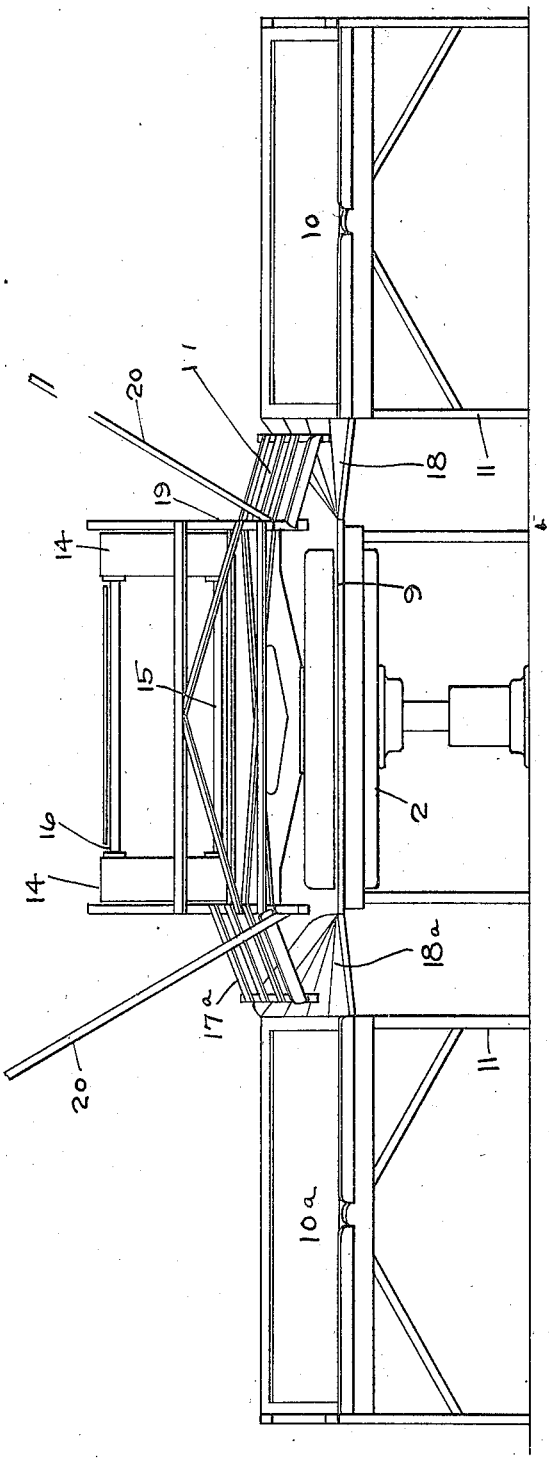

April 29, 1924.                          1,492,511
G. F. DICKSON ET AL
TRAY HANDLING MEANS FOR PRESSING MACHINES
Filed June 27, 1921      5 Sheets-Sheet 5
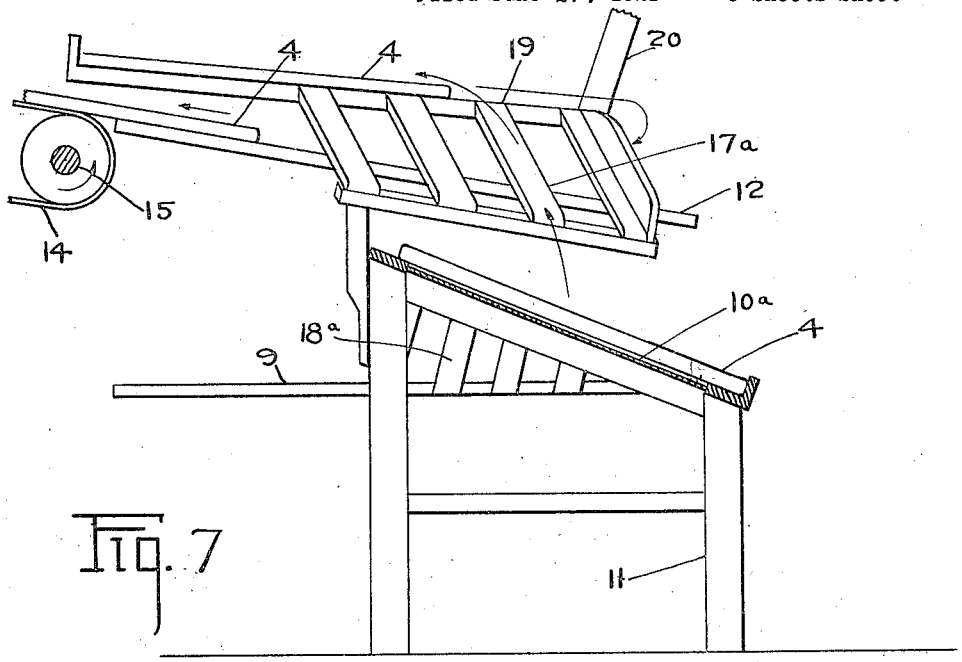
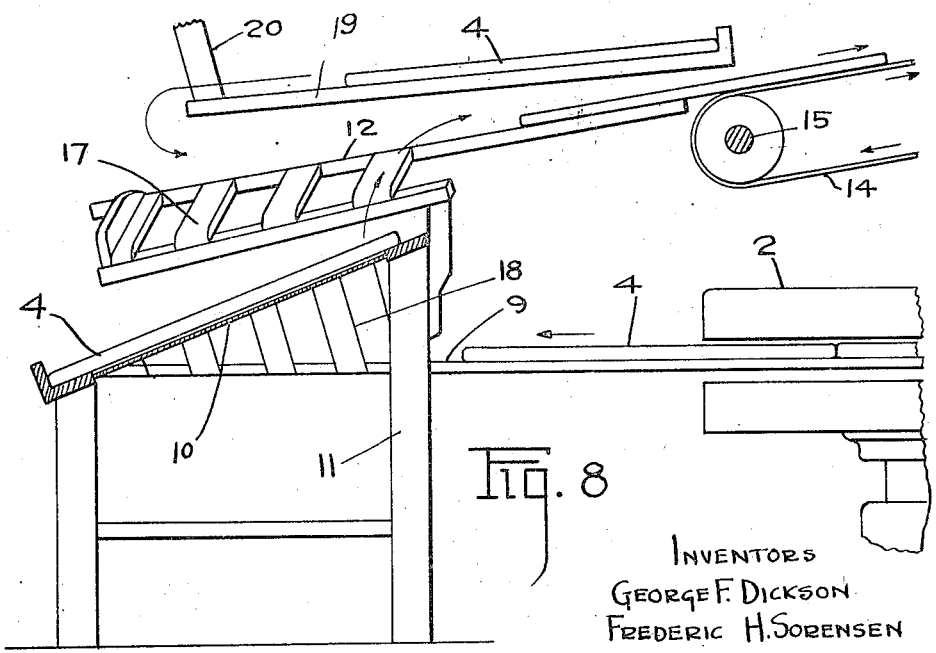
INVENTORS
GEORGE F. DICKSON
FREDERIC H. SORENSEN
THEODORE OLSON
By Paul Paul
THEIR ATTORNEYS Patented Apr. 29, 1924.

1,492,511

UNITED STATES PATENT OFFICE.

GEORGE F. DICKSON, OF MINNEAPOLIS, FREDERIC H. SORENSEN, OF ST. PAUL, AND THEODORE OLSON, OF MINNEAPOLIS, MINNESOTA.

TRAY-HANDLING MEANS FOR PRESSING MACHINES.

Application filed June 27, 1921. Serial No. 480,865.

*To all whom it may concern:*

Be it known that we, GEORGE F. DICKSON and FREDERIC H. SORENSEN, citizens of the United States, residing, respectively, at Minneapolis, county of Hennepin, State of Minnesota, and St. Paul, county of Ramsey, State of Minnesota, and THEODORE OLSON, a citizen of the Kingdom of Norway, residing at Minneapolis, county of Hennepin, State of Minnesota, have invented certain new and useful Improvements in Tray-Handling Means for Pressing Machines, of which the following is a specification.

In the operation of a pressing machine in a knit underwear mill, it has been customary to place the knitted garments on the trays, insert them into the pressing machine on one side to be pressed while held in the tray, remove the trays and pressed garments on the other side of the machine, then remove the garments and return the trays to the receiving side of the machine to repeat the operation. These trays, while comparatively light in weight, are large and cumbersome and considerable time is wasted in handling them and returning them to their filling position on the receiving side of the machine. When a pressing machine is working at full capacity, a large number of trays are in use and the attendants must work quickly to place the knitted garments in their pressing position on the trays, feed the trays to the machine, remove them and the pressed garments and return the trays to the starting point in order that the full capacity of the machine can be maintained. The operation requires the work of several attendants and considerable labor is involved in carrying the trays back and forth from one side of the machine to the other.

The object, therefore, of our invention is to provide an apparatus or attachment in connection with the pressing machine by means of which the empty trays can be rapidly and automatically returned to the filling point without any attention on the part of the operator except to remove the pressed garments and deliver the empty tray to the returning means.

A further object is to provide an attachment arranged in such a way that an attendant can discharge the filled tray from the machine at the same time that an empty tray is being delivered by another attendant to the returning means. Thereby the two operations may be carried on simultaneously without interference.

The invention consists generally in various constructions and combinations, all as hereinafter described and particularly pointed out in the claims.

In the accompanying drawings forming part of this specification,

Figure 1 is a plan view of the apparatus embodying our invention,

Figure 2 is a side elevation,

Figure 3 is an enlarged detail view, showing the means for delivering the empty trays to a magazine on the receiving side of the machine, Figure 4 is a transverse vertical sectional view, looking toward the discharge side of the machine, Figure 5 is a detail view, showing the drive for the return carrier, Figure 6 is an elevation of the delivery side of the apparatus, Figure 7 is an end elevation, partially in section, of the delivery side of the apparatus, Figure 8 is an elevation, partially in section, showing the manner of delivering the filled trays and returning the empty ones to the return conveyer.

In the drawing, 2 represents a pressing machine, of the usual type, having a table 3 adapted to receive trays 4 on which the garments to be pressed are placed. In the pressing of garments, a considerable number may be placed on each tray and this is done at the tables 5, one being shown on each side of the tray magazine. When these trays are filled, they are placed in racks 6, of which we have shown one on each side of the ironing machine, and adjacent the table thereof. An attendant is stationed at the operating table 7 in position to reach the trays conveniently and pull them one by one from the racks onto the pressing table, as shown in Figure 4. The filled tray is then pushed by mechanism 7' into the position for pressing the garments while held in the tray and the machine set in motion through the operation of the treadle 8. This pressing machine is of ordinary construction, well known in laundries and underwear mills, and we make no claim to the same herein, except in combination with our tray handling means.

When the garments have been pressed, the trays are delivered to a table 9 on the delivery side of the machine, where an attendant removes them one by one for delivery to the inclined racks 10 and 10ª located upon each side of the delivery table. The attendants then remove the garments from the trays. The frame 12 is supported above the delivery table and conveyer belts 14 are mounted on shafts 15 and 16 supported in bearings above the pressing machine and the receiving table in position to receive the empty trays from the frame 12 and return them to the receiving side of the machine. An upwardly inclined guide 17 is provided on one side of the frame 12 over which the empty trays are moved from the rack 10 for delivery to the carrier belts. Beneath the guide 17 is a guide 18 leading from the delivery table 9 to the rack 10, sufficient space being provided between the guides 17 and 18 to allow for convenient movement of the trays in opposite directions at the same time; that is, while the attendant standing near the delivery table is sliding a filled tray over the guide 18 to the rack 10, the attendant in front of the rack 10 may slide an empty tray over the guide 17 onto the frame 12. The rack 10ª has a guide 18ª leading from the delivery table to the rack 10ª and over which the filled trays are pushed and above this guide 18ª is an oppositely inclined guide 17ª which is upwardly inclined to a frame 19 supported by suitable means, such as hangers 20. This frame 19 is spaced from the frame 12 and allows empty trays to be moved in opposite directions at the same time, one onto the frame 12 for delivery to the conveyer belts and the other up onto the frame 19, where it remains until the attendant removes it for delivery to the frame 12 and carrier belts. We are thus able to economize time in the handling of the trays and prevent interference and congestion at the delivery side of the machine. As soon as an empty tray is engaged by the belts, it will be returned over the pressing machine to the attendant on the receiving side of the machine and delivered to a slide 21 over which the trays pass by gravity and drop edgewise into the magazine 22 having preferably a padded bottom 23 forming a cushion upon which the trays fall, ready to be removed and refilled. A guide 24 forms a continuation of the conveyer belts and is downwardly inclined toward the tray magazine.

The side wall of the magazine is also preferably lined with a yielding material, 26, which provides a resilient surface with which the trays contact as they enter the magazine. Guide boards 27 are also provided on each side of the guide 24. For the purpose of retarding or checking the movement of the empty trays toward the magazine, we prefer to provide a plate 28 pivoted at 29 and adjustable by means of a screw 30. The trays pass over this plate and are checked thereby and prevented from gaining an undesirable momentum in their movement toward the magazine.

The shaft 15 of the conveyer belts is driven through a pulley and belts 25ª from a shaft 25ᵇ that is driven through a belt 25ᶜ from a source of motive power 25ᵈ. By this means the conveyer belts are operated at any desired speed for transferring the empty trays from the discharge to the receiving side of the pressing machine.

In the operation of the apparatus, the attendant will stand at the receiving side of the machine, place the filled trays on the table and feed them through the mechanism of the machine into position for the pressing operation. As fast as the garments are pressed, the trays are fed out on the discharge side of the machine and the attendant at that point will remove them to the adjacent racks 10 or 10ª and strip the pressed garments from the trays. The empty trays are then delivered to the transfer belts in the manner heretofore described and returned to the magazine on the receiving side of the machine, where the attendants may conveniently reach them for refilling with the garments to be pressed.

We claim as our invention:

1. The combination, with a pressing machine having a table adapted to receive loose trays of garments and to press the garments while held in said trays, of tray receiving and delivery tables located at opposite sides of said press, and a tray conveyor extending from said delivery table to a point in proximity to said receiving table and adapted to return the empty trays when the pressed garments have been removed.

2. The combination, with a pressing machine adapted to receive trays of garments and to press the garments while held in said trays, of tray receiving and delivery tables located at opposite sides of said press, and an endless tray conveyor extending from said delivery table over said press and receiving table to a point beyond said receiving table.

3. The combination, with a pressing machine adapted to receive trays of garments and to press the garments while held in said trays, of tray receiving and delivery tables located at opposite sides of said press, a tray conveyor extending from said delivery table over said press and over said receiving table, and a magazine located at a point beyond said receiving table and arranged to receive trays from said conveyor.

4. The combination with a pressing machine having a table adapted to receive successively a series of loose trays of garments and to press the garments while held in said trays, of tray receiving and delivery tables located at opposite sides of said press, a tray conveyor extending from said delivery table to a point beyond said receiving table and adapted to receive the empty trays when the pressed garments are removed, and guiding means for directing trays from said delivery table to said conveyor.

5. The combination, with a pressing machine adapted to receive trays of garments and to press the garments while held in said trays, of tray receiving and delivery tables located at opposite sides of said press, a tray conveyor extending from said delivery table over said press and over said receiving table, a magazine located at a point beyond said receiving table and arranged to receive trays from said conveyor and means for regulating the discharge of trays from said conveyor to said reservoir.

6. The combination, with a pressing machine adapted to receive trays of garments and to press the garments while held in said trays, of tray receiving and delivery table located at opposite sides of said press, a tray conveyor extending from said delivery table to a point beyond said receiving table, a tray holding rack located in proximity to said delivery table, and a tray guiding means extending from said rack to said conveyor.

7. The combination, with a table to which trays of pressed goods may be delivered from a pressing machine, of a rack upon which said trays may be held while the garments are being removed therefrom, guides leading from said table to said rack, a tray conveyor, and a tray guiding means extending from said rack to said conveyor.

8. The combination, with a table to which trays of pressed goods may be delivered from a pressing machine, of a rack located in proximity to said table, guides leading from said table to said rack, a tray conveyor, a frame arranged above said table and connecting with said conveyor, and guides extending from said rack to said frame.

9. An apparatus for use with a garment press, comprising a receiving table positioned on one side of the press, a delivery table upon the opposite side of the press, a conveyor for receiving and returning the empty trays from the delivery to the receiving side of the press, and a magazine adjacent said receiving table whereto the empty trays are delivered by said conveyor.

10. An apparatus for use with a garment press, comprising a receiving table positioned on one side of the press and adapted to receive the loose trays whereon the garment to be pressed are placed, a delivery table upon the opposite side of the press, and a conveyor operating above the press and tables for returning the empty trays from the delivery side of the press to the receiving side thereof.

In witness whereof, we have hereunto set our hands this 23rd day of June, 1921.

GEORGE F. DICKSON.
FREDERIC H. SORENSEN.
THEODORE OLSON.